Nov. 1, 1960
E. C. YOUNG
2,958,355
POTATO PEELER
Filed Oct. 24, 1957
2 Sheets-Sheet 2
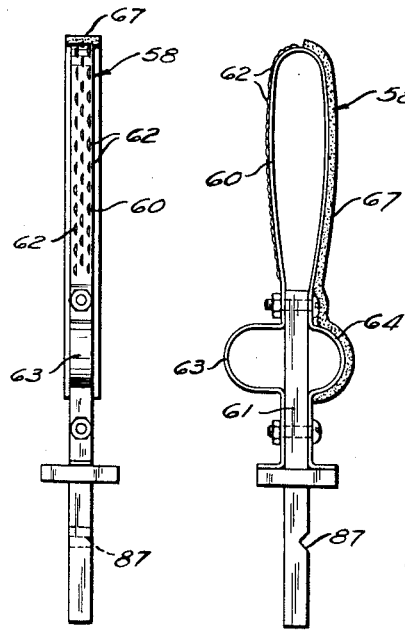
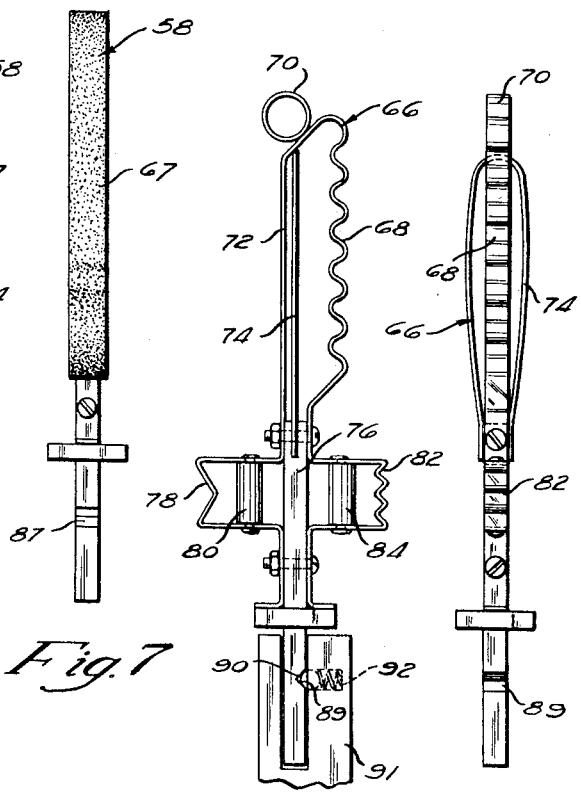
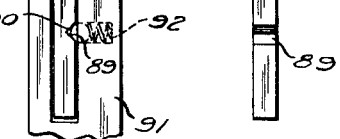
Fig. 6  Fig. 5  Fig. 7  Fig. 8  Fig. 9
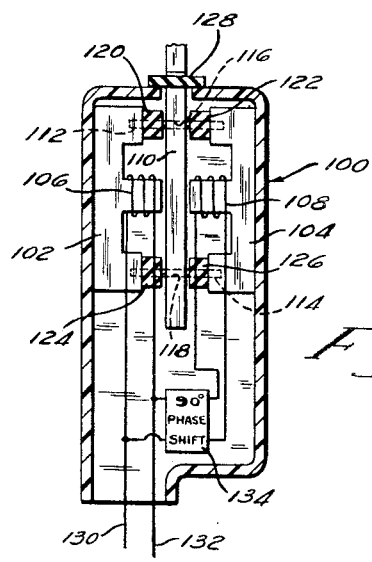
Fig. 10
INVENTOR.
EVERETT C. YOUNG
BY
RICHEY, WATTS, EDGERTON,
MCNENNY & FARRINGTON
Karl A. Okralik
ATTORNEYS

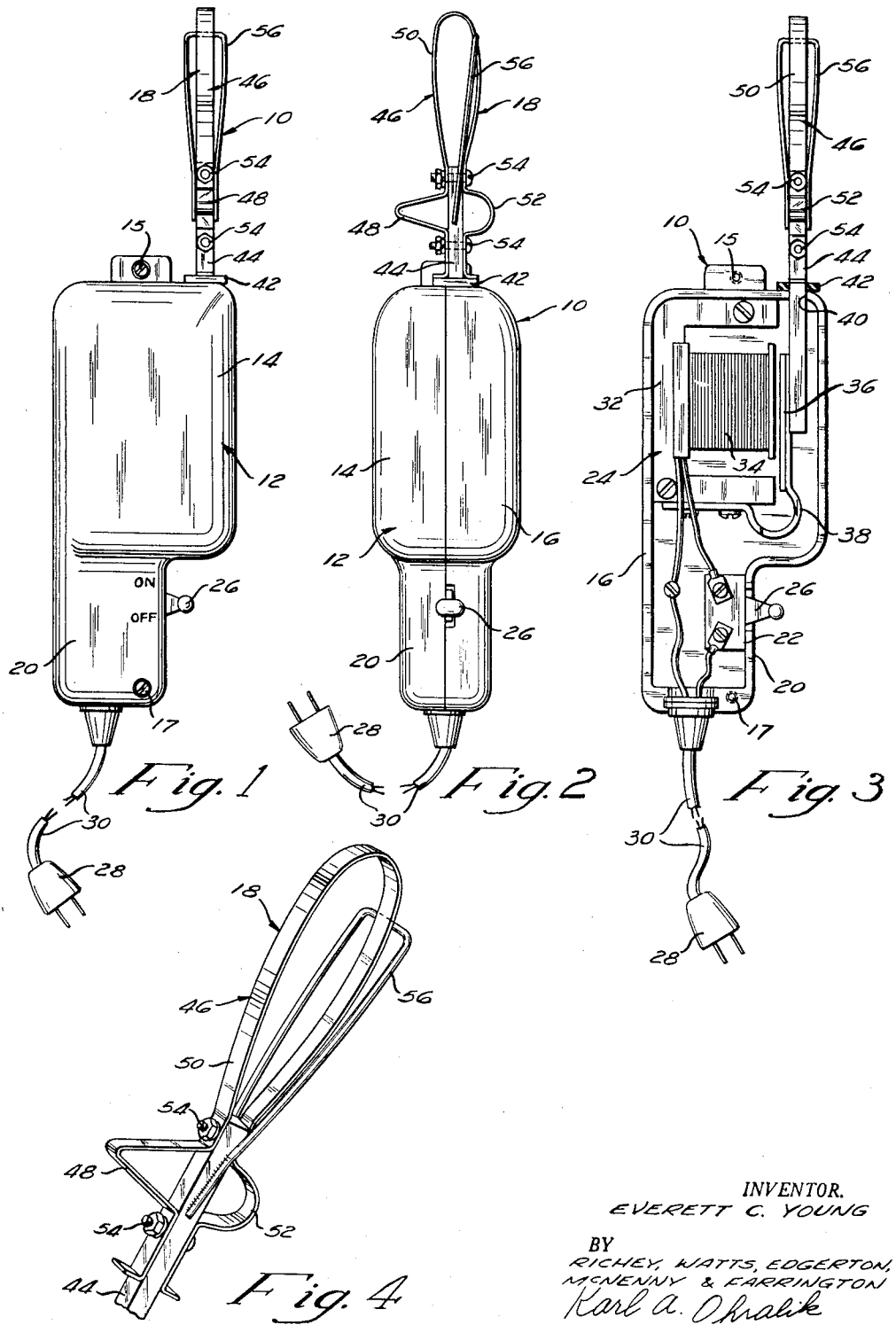

United States Patent Office 2,958,355
Patented Nov. 1, 1960

2,958,355

POTATO PEELER

Everett C. Young, 4037 Rocky River Drive, Cleveland, Ohio

Filed Oct. 24, 1957, Ser. No. 692,209

7 Claims. (Cl. 146—204)

This invention relates to a vibratory apparatus and more particularly to a portable vibratory apparatus adaptable for performing various culinary functions.

It is an object of this invention to facilitate the preparation of various fruits, vegetables and the like for cooking and human consumption, by removing the peels, and other inedible and unpalatable portions therefrom and by shredding certain fruits or vegetables. Although this invention is equally applicable in preparing innumerable fruits, vegetables and the like for human consumption and for treating innumerable other substances, for simplicity of explanation, the same will be described with respect to a select few of such applications it being understood that the same is not so limited in its application.

It is another object of this invention to provide a culinary apparatus for peeling and removing inedible or unpalatable portions of a fruit or vegetable that is simple, effective and efficient in operation, light in weight, inexpensive in manufacture and upkeep and safe even when used by inexperienced operators.

According to this invention a blade having edges which may be relatively dull when compared with a conventional kitchen knife is adapted for rapid vibration to facilitate removal of peels from a potato or other fruit or vegetable when moved over the surface thereof in contact therewith.

As another important feature of this invention the blade includes opposed peeling edges whereby the potato surface may be peeled by drawing the blade toward or away from the operator as the occasion may require or as the operator may choose.

Heretofore, it has been most expeditious and customary in preparation of edibles such as potatoes, to remove the peels, and other indedible or unpalatable portions therefrom by simple paring with a knife. Removing of such peels in this manner is, of course, wasteful of the edible portions of the potato, unless unusual pains are taken to pare only a very thin portion of the surface of the potato which in turn is a very time consuming and tedious operation. It is also frequent that such peels or inedible portions must be removed from crevices in the surface of the potato which is very difficult and bothersome when done by paring.

According to this invention a blade having rebent portions is mounted for rapid vibration in a portable and easily manipulable housing. The blade is adapted to be brought into contact with the surface of the potato or other fruit or vegetable to be peeled and the rapid vibrations of the blade are effective upon slight pressure thereagainst to remove only the peel therefrom. Upon greater pressure the blade is effective to remove as much of the fruit or vegetable as desired.

According to a further feature of this invention the vibrating blade is provided with a "floating" or "butterfly" type of motion wherein the same in one embodiment may be fixedly secured at its inner end and driven for reciprocatory motion intermediate its length. In another embodiment a somewhat different floating vibratory movement of the blade is achieved by a blade support at the location of the vibratory driving means for guiding the movement of the blade and wherein either end of the blade support and the blade is unattached to other elements. This motion is to be distinguished from a strictly positive, rigid driving motion wherein the vibrating member is driven through the full amplitude of its reciprocation even under load. It is by virtue of this improved blade mounting that a feature of safety of this invention is inherently accomplished. As distinct from vibratory means requiring full amplitude of reicprocation for continued operation thereof, the reciprocatory elements of this invention continue to vibrate as a retarding force is applied against the same, but at a decreased amplitude. Thus as the vibrating blade edge is brought into contact with flesh which has a certain degree of resiliency, the blade is completely ineffective to cut or otherwise harm the flesh even when the blade is provided with a comparatively narrow edge.

It is another object of this invention to facilitate peeling of only the inedible portions of the potato surface by providing means co-operable with a vibrating rebent blade to limit the engagement between the blade and the potato.

Other and further objects and advantages of this invention will become apparent from a perusal of the following detailed description considered with the accompanying drawings in which:

Figure 1 is an elevational side view of the invention,

Figure 2 is an elevational front view of the invention as it appears from the right in Figure 1, Figure 3 is a sectional side view in elevation showing a portion of the interior of the housing enclosing certain parts of the invention, including the vibratory driving portion thereof, Figure 4 is a perspective view of the blade assembly having rebent blade portions and forming an important feature of this invention.

Figure 5, 6 and 7 are front and respective side elevational views of a second embodiment of blade assembly forming a part of the invention and having a scalloped portion peculiarly adaptable for scrubbing and shredding various fruits, vegetables and the like, Figures 8 and 9 are elevational views taken 90° relative to each other, of a third embodiment of blade assembly forming a part of the invention and having sections adaptable for performing certain specific culinary functions, and Figure 10 is a sectional view of another form of vibratory driving apparatus.

Referring now to Figures 1 through 4 of the drawings for a detailed description of the invention, 10 represents generally the entire peeler which includes a housing 12 having interfitting sections 14 and 16 attachable by screws 15 and 17, shown clearly in Figure 1 for enclosing certain component parts thereof. A blade represented generally at 18 extends from the top of housing 12 as viewed in the drawings and for mainpulating blade 18 with facility, housing 12 is shaped to provide a handle 20 at its lower end adapted to be gripped by a hand. A switch 22 shown in Figure 3 for controlling a blade vibrating motor 24 within the housing 12 is provided with a control arm 26 extending exteriorly of the housing and adapted also to be easily manipulated while the handle 20 is being held in the hand. Electrical energy is supplied to motor 24 through a plug 28, and a line cord 30 and switch 22 is interposed in one line of cord 30 for controlling energization of motor 24.

As seen clearly in Figure 3 of the drawings, motor 24 includes a frame member 32 around a portion of which is disposed a coil 34 energized through line cord 30 for magnetically attracting a magnetizable armature 36 secured to frame member 32 through a resilient member 38 having a curved portion therealong, and to blade assembly 18.

Blade assembly 18 extends from within housing 12 outwardly through an opening 40 which is preferably sealed by a grommet 42 to prevent water or other foreign matter from entering the confines of the housing. Blade assembly 18 includes a base bar 44 secured directly to armature 36 and a blade member 46, having rebent portions 48, 50 and 52, secured to bar 44 as by nut and screw combinations 54. It is noted that nut and screw combinations 54 are readily detachable to disassemble blade assembly 18 for cleaning, repair or other purpose. Blade portion 48 includes straight sides terminating in a slightly rounded apex to form a comparatively stiff portion for enabling peeling of crevices of potatoes. Blade portion 50 is curved in a generally elliptical contour to form a resilient and yielding portion for peeling the regular surface portions of potatoes and blade portion 52 is semi-circular in contour to form a comparatively stiff section particularly adaptable for peeling re-entrant portions of a potato. A wire guide and guard 56 is provided for controlling the thickness or depth of peeling and is mounted as by soldering at its respective ends to bar 44.

Blade assembly 18 is preferably formed of corrosion resistant material and is so sized and proportioned as to permit rapid vibration by the motor 24. Grommet 42, as well as excluding undesirable matter from within the peeler housing, is so proportioned and disposed as to aid in governing the reciprocatory movement of blade assembly 18.

It is to be understood that according to this invention blade portions 48, 50 and 52 may take a variety of shapes or construction. As an example, the same may comprise a thin wire bent as the blade portions 48, 50 and 52, or a sheet having edges as edges of these portions. It is also to be noted that blade portions 48, 50 and 52 are equally adaptable to cut along either edge whereby the peeler may be used by a right or left handed person.

In the operation of the present invention the same plug 28 is plugged into a regular electrical outlet and peeler 10 is held in the hand by handle 20. Control arm 26 having been in the "off" position is placed in the "on" position to energize motor 24 and to vibrate blade assembly 18. A potato, for example, may be held in the free hand of the operator and when any of the blade portions 48, 50 or 52 are brought into contact with the potato and moved over the surface thereof will remove the peel and inedible portions therefrom.

As mentioned hereinabove, the blade of this invention is adaptable for many culinary functions. The blades as well as being effective to remove peels from various fruits and vegetables is also effective upon greater pressure to cut through the fruit or vegetable to produce chopped, shredded or cut up vegetables.

In accordance with one effective embodiment of the invention, the tip of blade 50 was vibrated with an amplitude of from $1/16''$ to $3/8''$ with excellent results. It is to be understood, however, that the range of amplitudes may be considerably greater, depending upon the results desired.

In accordance with another feature of the invention, the peeling blade assembly 58 as shown in Figures 5, 6 and 7 is provided with a rebent portion 60 secured to a base bar 61 having a plurality of scallops as at 62 along a portion thereof. Scallops 62 may be in the shape of small scoops punched away from the main body of the blade portion which scoops are particularly well adapted for shredding and scrubbing various fruits, vegetables and the like and removing re-entrant portions of the same.

The blade 58 is further provided with another rebent blade 63 similar to rebent blade 52 of blade assembly 18 and a rebent blade 64 which together with a part of rebent blade 60 is covered with abrasive sponge material 67 exteriorly applied for facilitating scrubbing of pots, pans and the like by a vibratory motion of the blade assembly. This abrasive surface is very effective in cleaning utensils by a very simple manipulation of the apparatus as to place the abrasive into contact with utensil walls. In addition, this abrasive surface is remarkably effective during vibratory motion, to scrub potatoes and the like to remove the unwanted surface coating thereof.

Referring now to Figures 8 and 9 of the drawing, 66 represents a blade assembly according to another embodiment of the invention wherein 68 represents a blade having a corrugated surface for cutting slices of potatoes, beets and the like to have an attractive and more appetizing wavy appearance. A loop 70 at the outer extremity of the blade assembly 66 is particularly adaptable for cutting potatoes for "french fries." Loop 70 may alternatively have any closed shape such as a square or other polygon.

For enabling cutting vegetables into thin slices, a blade portion 72 is provided at the remaining part of blade 68 and a depth guard 74 secured to the blade supporting shaft 76 controls the thickness of slice of the vegetable. As may be readily understood, this feature of the invention is adaptable for cutting potatoes for potato chips.

For producing "french fries" of a somewhat different shape and character, a rebent blade 78, having a roller 80 suspending portions thereof is provided. Roller 80 provides for free rolling movement of the slice of potato passing between the blade 78 and roller 80 while restricting the size of the slice of potato.

For shredding carrots and the like, another rebent blade 82 is provided with a corrugated outer surface and a roller 84 suspending a portion thereof which also provides free rolling movement of the slice of carrot passing between the blade 82 and roller 84 while also restricting the size of the slice of carrot.

In the blade assemblies as shown in Figures 5 through 9, the blade is secured to base bars 61 or 76 which are substantially the same in length, cross-section, etc., and which further are provided with recesses 87 and 89 near the lower ends thereof for receiving a spring biased ball detent 90 mounted in the vibratory armature of the invention. Detent 90 is effective to restrain axial movement of bars 61 or 76 when engaging the respective recesses 87 or 89 of the bar as shown in Figure 8. In this figure, ball 90 is mounted in an armature 91 and is biased by a spring 92 against recess 89.

Referring now to Figure 10, 100 represents another embodiment of vibrator forming a part of this invention and including a pair of opposed magnetic cores 102 and 104 having electrical windings 106 and 108 around respective central portions of the cores. A base bar represented at 110 is supported between opposed ends of the cores by cross bars 112 and 114 extending into respective pairs of aligned bores in end portions of cores 102 and 104. The bars extend through bores 116 and 118 in bar 110. The amplitude of vibration of bar 110 is limited by elastic block pairs 120, 122 and 124, 126 mounted on respective cross bars 112 and 114. A sealing grommet 128 is provided around bar 110 at the vibrator housing to seal the housing from water, dirt and other foreign matter.

Windings 106 and 108 are electrically energized through line connections 130 and 132 and a phase shifter 134 provides a 90 degree phase shift in the energizing current passing through winding 106 relative to the phase of the current passing through winding 108 whereby the maximum energization of one winding occurs at the time of minimum energization of the other winding. Accordingly, blade bar 110 and the blades carried thereby are vibrated in a floating type of action.

As explained hereinabove, this invention is adaptable for a multitude of culinary functions to greatly alleviate the burdens of housekeepers and to speed the preparation of meals while also rendering the same more appealing and appetizing. In this day of remarkable scientific and technological advance and mechanization of previously manually performed operations, this invention in conformance with this trend provides for mechanization and simplification of tedious, manual culinary operations.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. A culinary apparatus comprising a hollow housing of a form and shape to be held in the human hand, a vibrator within said housing including a frame, a coil winding on the frame, a magnetizable armature and means to position the armature relative to the core winding, said armature positioning means including a member having a first portion secured to the frame, a second portion connected to said armature and a curved resilient portion between said first and second portions, an electrical conductor extending into the housing and connected to the core winding, a blade assembly rigidly connected to and carried solely by said armature positioning means, said assembly including a base bar connected to said second portion of said member and a blade extending through an enlarged opening into housing and having an inner end detachably secured to said base bar, whereby said blade is reciprocated smoothly, bodily and resiliently when the core is energized.

2. The combination of elements set forth in claim 1 in which the blade includes a knife in the form of a thin, narrow, sharp-edged, U-shaped metal strip for peeling foodstuffs and a guard extending along said strip for controlling the thickness of the peel along the knife.

3. The combination of elements set forth in claim 1 in which one end of the knife has a portion projecting at a sharp angle to the plane of the strip for making small diameter deep openings in a foodstuff.

4. The combination of elements set forth in claim 1 in which one end of the knife has an arc shaped portion projecting from the plane of the strip for forming shallow, large diameter openings in a foodstuff.

5. The combination of elements set forth in claim 1 in which a grommet extends around said blade and seals said enlarged opening.

6. The combination of elements set forth in claim 1 in which the blade includes a part having a surface coating of abrasive material.

7. The combination of elements set forth in claim 1 in which the blade includes a flat metal part provided with scallops for shredding or scrubbing fruits, vegetables and the like.

References Cited in the file of this patent

UNITED STATES PATENTS

| | | |
|---|---|---|
| D. 26,679 | Aberer | Feb. 23, 1897 |
| 341,664 | Krayer | May 11, 1886 |
| 1,374,289 | Dunkley | Apr. 12, 1921 |
| 1,390,702 | Hammond | Sept. 13, 1921 |
| 2,337,236 | Gamble | Dec. 21, 1943 |
| 2,602,475 | Andreae et al. | July 8, 1952 |
| 2,629,928 | Moraveik | Mar. 3, 1953 |
| 2,876,537 | Bates | Mar. 10, 1959 |

FOREIGN PATENTS

| | | |
|---|---|---|
| 753,902 | France | Aug. 21, 1933 |
| 1,118,693 | France | Mar. 19, 1956 |